United States Patent [19]

Kanada

[11] Patent Number: 5,504,730
[45] Date of Patent: Apr. 2, 1996

[54] DISK CARTRIDGE LOADING MECHANISM FOR USE IN DISK RECORDING AND/OR REGENERATING DEVICE HAVING A REDUCED THICKNESS AND REDUCED COMPLEXITY

[75] Inventor: Tokio Kanada, Kanagawa, Japan

[73] Assignee: Sony Corporation, Tokyo, Japan

[21] Appl. No.: 329,680

[22] Filed: Oct. 26, 1994

Related U.S. Application Data

[63] Continuation of Ser. No. 984,102, Dec. 1, 1992, abandoned.

[30] Foreign Application Priority Data

| Dec. 11, 1991 | [JP] | Japan | 3-323346 |
| Dec. 11, 1991 | [JP] | Japan | 3-327344 |
| Dec. 11, 1991 | [JP] | Japan | 3-327345 |
| Dec. 11, 1991 | [JP] | Japan | 3-327347 |

[51] Int. Cl.[6] ............... G11B 33/02; G11B 17/04
[52] U.S. Cl. ............... 369/75.1; 369/77.2; 360/96.6; 360/99.06
[58] Field of Search ............... 360/99.02, 99.06, 360/98.04, 98.06, 99.07, 96.6; 369/75.1, 77.1, 77.1, 77.2

[56] References Cited

U.S. PATENT DOCUMENTS

| 4,466,032 | 8/1984 | Saito | 360/99 |
| 4,498,161 | 2/1985 | Eisemann . | |
| 4,498,161 | 2/1985 | Eisemann | 369/77.2 |
| 4,562,566 | 12/1985 | Eisemann . | |
| 4,694,362 | 9/1987 | Oosaka et al. | 360/99.06 |
| 4,694,364 | 9/1987 | Matsuda et al. . | |
| 4,755,895 | 7/1988 | Saito | 360/97 |
| 4,866,551 | 9/1989 | Kishimoto et al. | 360/99.06 |
| 5,034,824 | 7/1991 | Morisawa et al. . | |
| 5,067,121 | 11/1991 | Einhaus . | |
| 5,166,918 | 11/1992 | Kamijo | 360/99.06 |
| 5,198,944 | 3/1993 | McReynolds et al. | 360/99.06 |
| 5,249,091 | 9/1993 | Shimizu et al. | 360/99.06 |
| 5,260,922 | 11/1993 | Chigasaki | 360/99.06 |

FOREIGN PATENT DOCUMENTS

| 0090460 | 10/1983 | European Pat. Off. . | |
| 0315255 | 5/1989 | European Pat. Off. . | |
| 4021217 | 1/1991 | Germany . | |
| 218680 | 12/1984 | Japan | 360/99.06 |
| 214448 | 10/1985 | Japan | 360/99.06 |
| 155551 | 6/1989 | Japan | 360/99.06 |
| 2225145 | 5/1990 | United Kingdom . | |

Primary Examiner—Robert S. Tupper
Assistant Examiner—George J. Letscher
Attorney, Agent, or Firm—Ronald P. Kananen

[57] ABSTRACT

A cartridge loading mechanism includes a cartridge holder having one end rotatably supported to a chassis for loading and unloading a cartridge. A holder drive mechanism is for moving a fulcrum of the cartridge holder away from the chassis in accordance with rotation of the cartridge holder in the unloading direction, and for moving the fulcrum of the cartridge holder near to the chassis in accordance with rotation of the cartridge holder in the loading direction.

5 Claims, 13 Drawing Sheets

FIG.19

DISK CARTRIDGE LOADING MECHANISM FOR USE IN DISK RECORDING AND/OR REGENERATING DEVICE HAVING A REDUCED THICKNESS AND REDUCED COMPLEXITY

This application is a continuation of application Ser. No. 07/984,102 filed Dec. 1, 1992, now abandoned.

BACKGROUND OF THE INVENTION

The present invention relates to a disk cartridge loading mechanism for use in a disk recording and/or regenerating device and, more particularly, to a disk cartridge loading mechanism provided with a holder for holding a disk cartridge as a recording medium.

Figure 1:
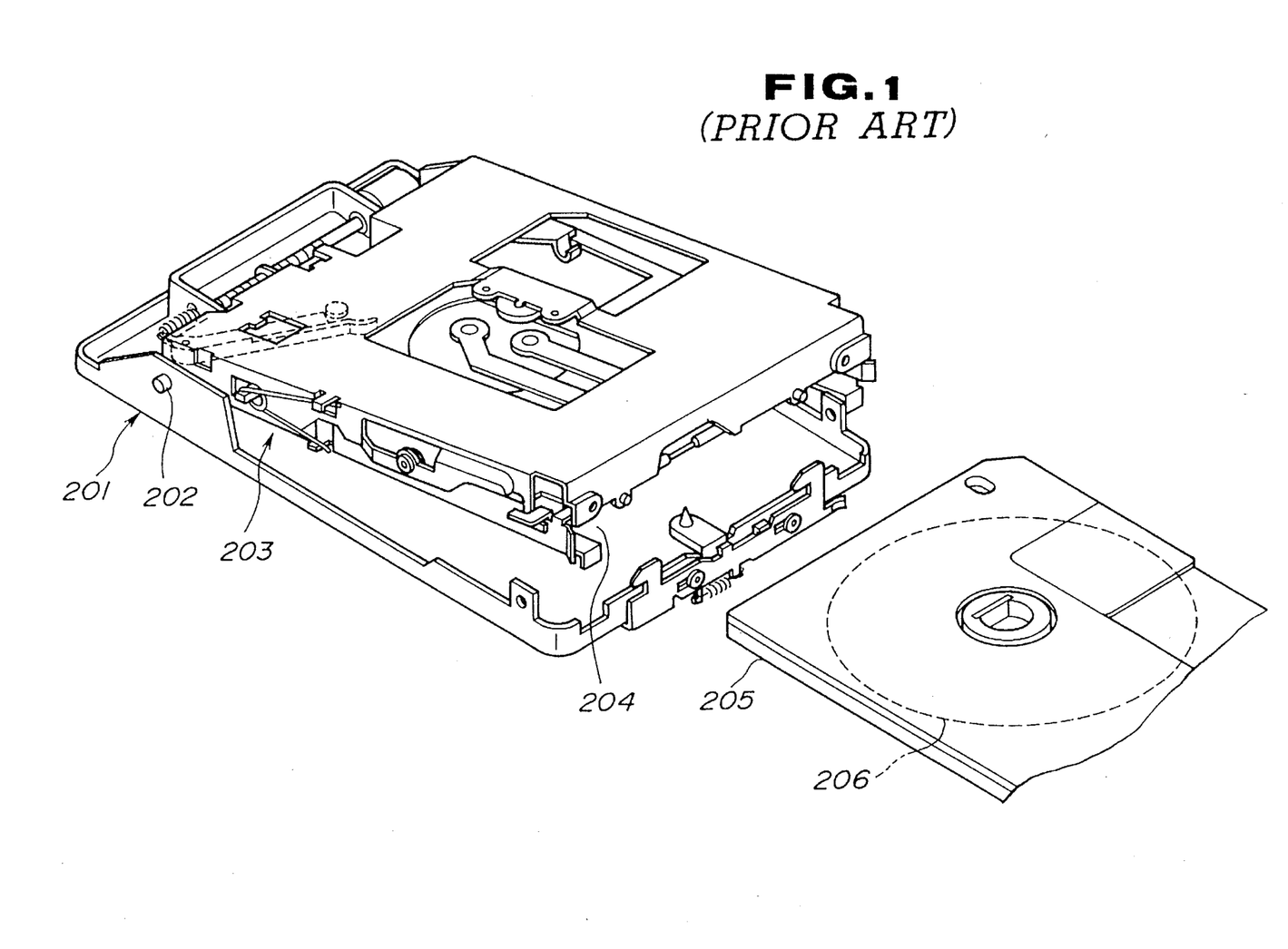
FIG. 1 is a perspective view showing a known disk cartridge loading mechanism.

Referring to FIG. 1, a known cartridge loading mechanism includes a chassis 201 on which a spindle motor (not shown), etc. are mounted, and a holder 203 having one end rotatably supported thereon by support shafts 202.

With the known disk cartridge loading mechanism, when making the holder 203 inclined at a predetermined elevation angle or so-called open angle so that a cartridge take-off opening 204 provided at another end of the holder 203 is turned upward on the support shafts 202 as a fulcrum, the holder 203 is in the unloading state. If, in this state, a disk cartridge 205 as a medium is inserted into the holder 203 from the cartridge take-off opening 204, and the holder 203 is rotated downward to be in the loading state, a disk 206 of the disk cartridge 205 received in the holder 203 is chucked on the spindle motor to rotate therewith.

With the known disk cartridge loading mechanism, however, since the support shafts 202 of the holder 203 are supported to the chassis 201, and therefore, positional displacement of the support shaft 202 is not possible in the vertical direction, etc., there arise the following problems:

1) When the holder 203 is in the unloading or ejecting state, its open angle or inclination angle is larger, so that upon unloading, the spindle motor, head for record and regeneration of a disk, etc. can be seen from below the holder 203, becoming unpreferred in terms of appearance.

2) The open angle of the holder 203 is large, so that a dead space is enlarged, resulting in a difficulty of reducing the thickness of a main body of the mechanism.

It is, therefore, an object of the present invention to solve the above prior art problems, and to provide a disk cartridge loading mechanism which is hard to see a spindle motor, head, etc. from below a holder even upon the unloading of a holder by reducing an open angle upon unloading thereof. Another object is to provide a disk cartridge loading mechanism which is easy to reduce a thickness.

SUMMARY OF THE INVENTION

According to one aspect of the present invention, a cartridge loading mechanism for use in a disk recording and/or regenerating device for recording and/or regenerating signals on a disk received in a cartridge, comprises:

a chassis;

a holder arranged to hold the cartridge, said holder having one end rotatably supported to said chassis for carrying out a loading and a unloading of the cartridge, said holder having a fulcrum; and a driver for moving said fulcrum of said holder away from said chassis in accordance with a rotation of said holder in a direction of said unloading of the cartridge, and moving said fulcrum of said holder near to said chassis in accordance with a rotation of said holder in a direction of said loading of the cartridge.

According to another aspect of the present invention, a cartridge loading mechanism for use in a disk recording and/or regenerating device for recording and/or regenerating signals on a disk received in a cartridge, comprises:

a head carriage provided with a head for recording and/or regenerating the signals on the disk;

a chassis arranged to slidably support said head carriage in a manner to be movable in a radial direction of the disk, said chassis being provided with a driver for driving said head carriage;

a holder arranged to hold the cartridge, said holder having one end rotatably supported to said chassis for carrying out a loading and a unloading of the cartridge, said holder having a fulcrum;

a driver for moving said fulcrum of said holder away from said chassis in accordance with a rotation of said holder in a direction of said unloading of the cartridge, and moving said fulcrum of said holder near to said chassis in accordance with a rotation of said holder in a direction of said loading of the cartridge;

a lock for carrying out a lock of said holder in a position of said loading of the carriage; and a lock release, engaged with said lock, for driving said lock means to release said lock of said holder in accordance with an actuation of said driver.

DETAILED DESCRIPTION OF THE INVENTION

Figure 2:
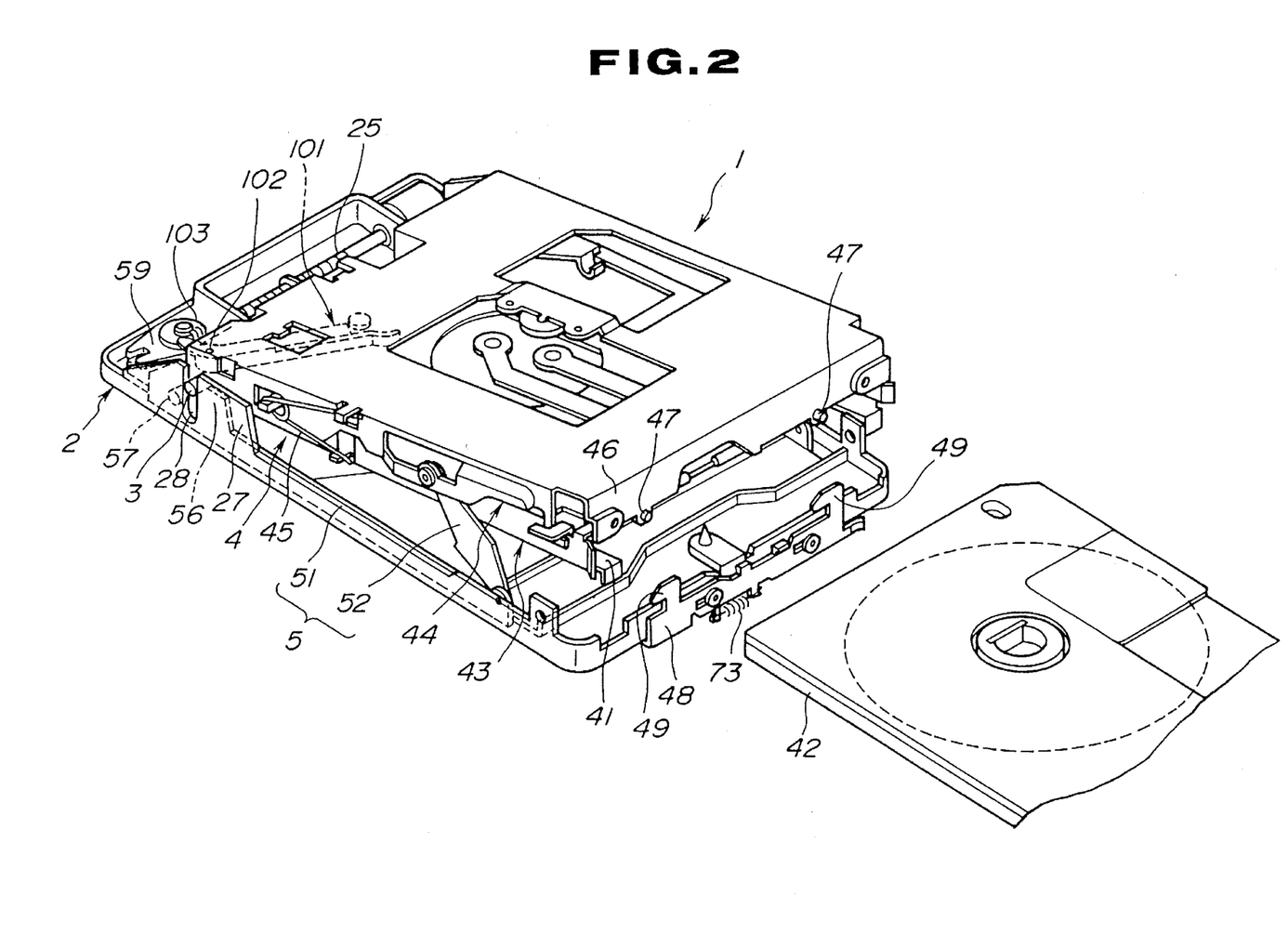
FIG. 2 is a perspective view similar, showing a disk cartridge loading mechanism embodying the present invention.

Referring to FIG. 2, a disk cartridge loading mechanism, designated generally by 1, includes a chassis 2, a holder 4 having one end rotatably and vertically movably mounted thereon by support shafts 3, and a holder drive mechanism 5 for rotating the holder 4 in the unloading direction and moving upward the support shafts 3 and for rotating the holder 4 in the loading direction and moving downward the support shafts 3.

Figure 3:
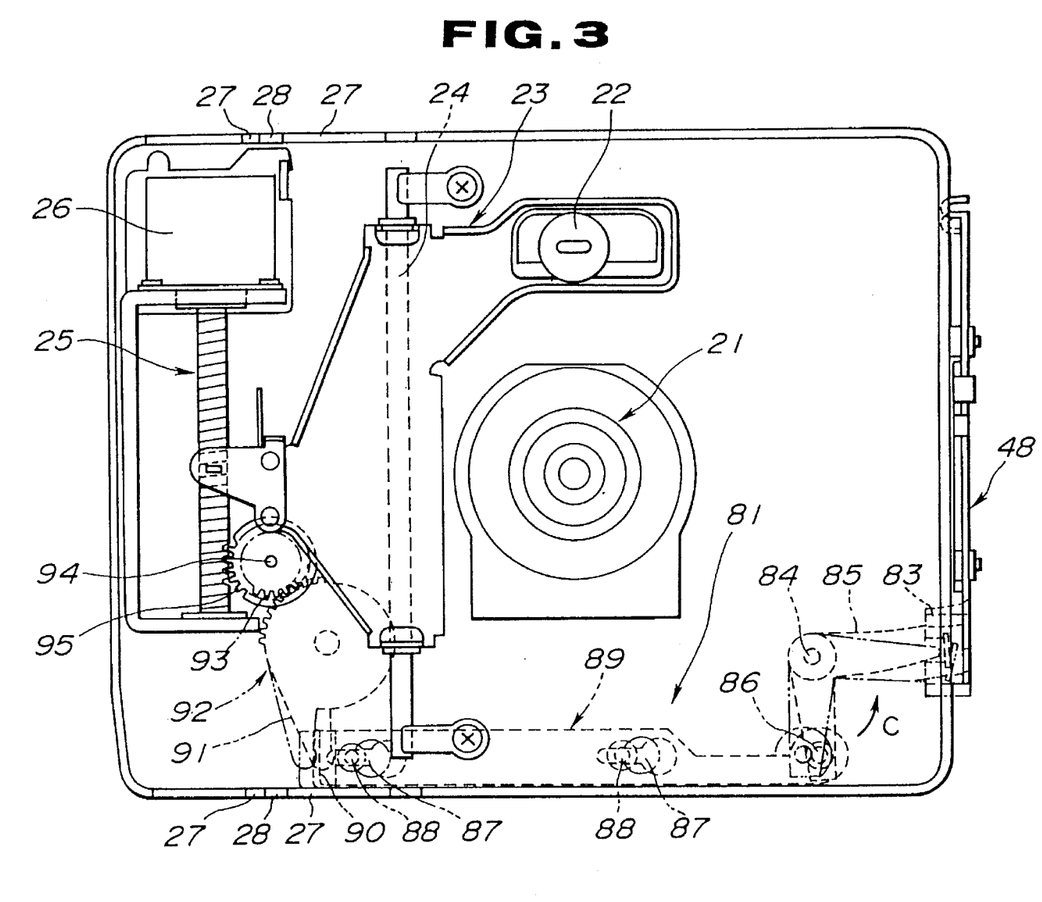
FIG. 3 is a plan view showing the mechanism with a holder removed.

Referring to FIG. 3, mounted on the chassis 2 are a spindle motor 21 for rotating a disk, a head 22 for reading and writing signals on the disk to be rotated by the spindle motor 21, a head carriage 23 for supporting the head 22, a guide shaft 24 for guiding the head carriage 23 so that the head 22 is urged to move in the radial direction of the disk, a lead screw 25 for moving the head carriage 23 along the guide shaft 24, and a stepping motor 26 for rotating the lead screw 25.

Additionally, erectly arranged to the chassis 2 at its one end or inner end and on its right and left sides are a pair of bearing lugs 27, 27 which are formed with longitudinal bearing holes 28, 28.

Next, the holder 4 will be described.

As best seen in FIG. 2, the holder 4 includes a main body portion 43 having one end with a cartridge take-off opening 41 for receiving and holding a disk cartridge 42 as a medium to be inserted therein from the cartridge take-off opening 41, a cover portion 44 rotatably mounted to the main body portion 43, and a torsion coil spring 45 interposed between the main body portion 43 and the cover portion 44 for maintaining the two portions 43, 44 opened at a predetermined open angle.

Additionally, arranged to the holder cover portion 44 at its one end opposite to the cartridge take-off opening 41 and on its right and left sides are the support shafts 3, 3 which are fitted in the longitudinal bearing holes 28, 28 of the bearing lugs 27, 27 so as to rotatably and vertically movably mount the support shafts 3, 3, to the holder 4 on the chassis 2.

Figure 4:
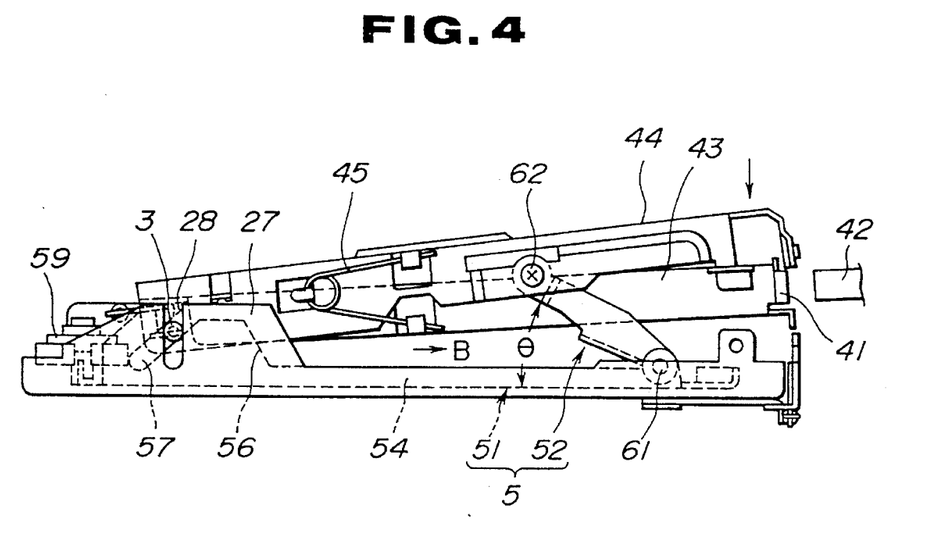
FIG. 4 is a side view showing the holder in the unloading state.
Figure 5:
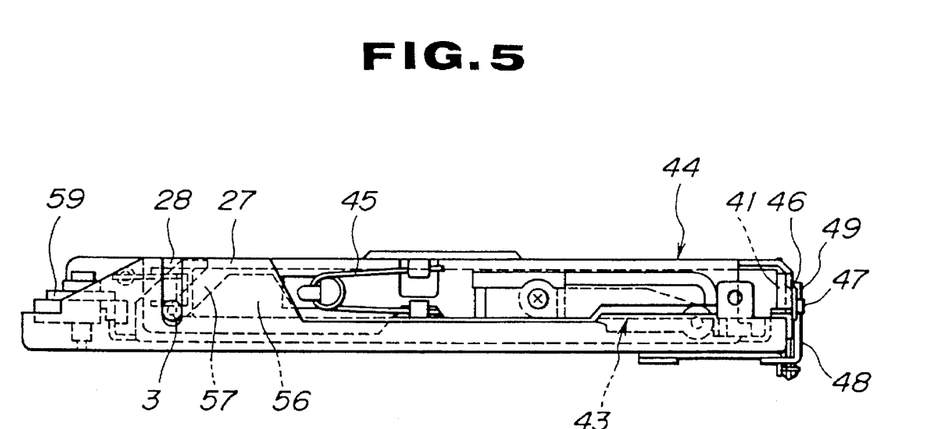
FIG. 5 is a view similar to FIG. 4, showing the holder in the loading state.

In the state as shown in FIG. 4, if an upper face of the holder cover portion 44 is pressed downward after inserting the disk cartridge 42 in the holder main body portion 43 from the cartridge take-off opening 41, the support shafts 3, 3 of the holder 4 come down to lower ends of the bearing holes 28, 28 through the holder drive mechanism 5 which will be described in detail later. The holder cover portion 44 lies on the holder main body portion 43 against force of the torsion coil spring 45, so that, as shown in FIG. 5, the cartridge take-off opening 41 of the holder main body portion 43 is closed by an end face plate 46 arranged to the holder cover portion 44 at its end.

When the end face plate 46 of the holder cover portion 44 closes the cartridge take-off opening 41 of the holder main body portion 43, and the holder 4 comes to the loading position, pin engagement portions 49, 49 of a holder lock plate 48 arranged to the chassis 2 at its front face are engaged with lock pins 47, 47 arranged to the end face plate 46, thus holding the holder 4 in the loading position.

Next, the holder drive mechanism 5 will be described.

As best seen in FIG. 2, the holder drive mechanism 5 includes a slider 51 to be urged to slide along the chassis 2 for vertically moving the holder 4, and a pair of rotating levers 52, 52, each having one end pivotally supported to the slider 51 and another end pivotally supported to the holder 4. The slider 51 is for rotating the holder 4 in the unloading direction when the slider 51 is urged to slide in the direction to move upward the holder 4, and in the loading direction when the slider 51 is urged to slide in the direction to move downward the holder 4.

Figure 6:
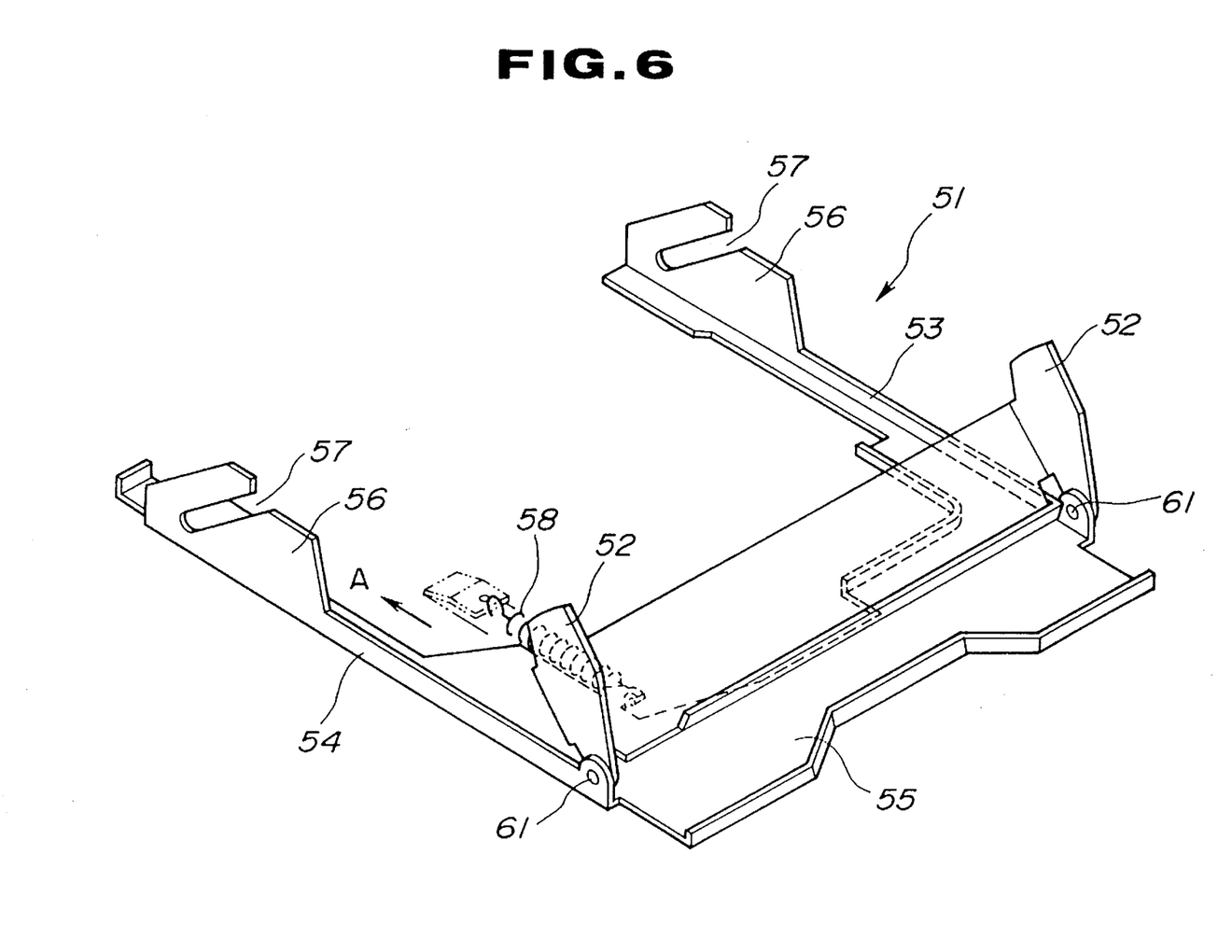
FIG. 6 is a view similar to FIG. 2, showing a slider.
Figure 7:
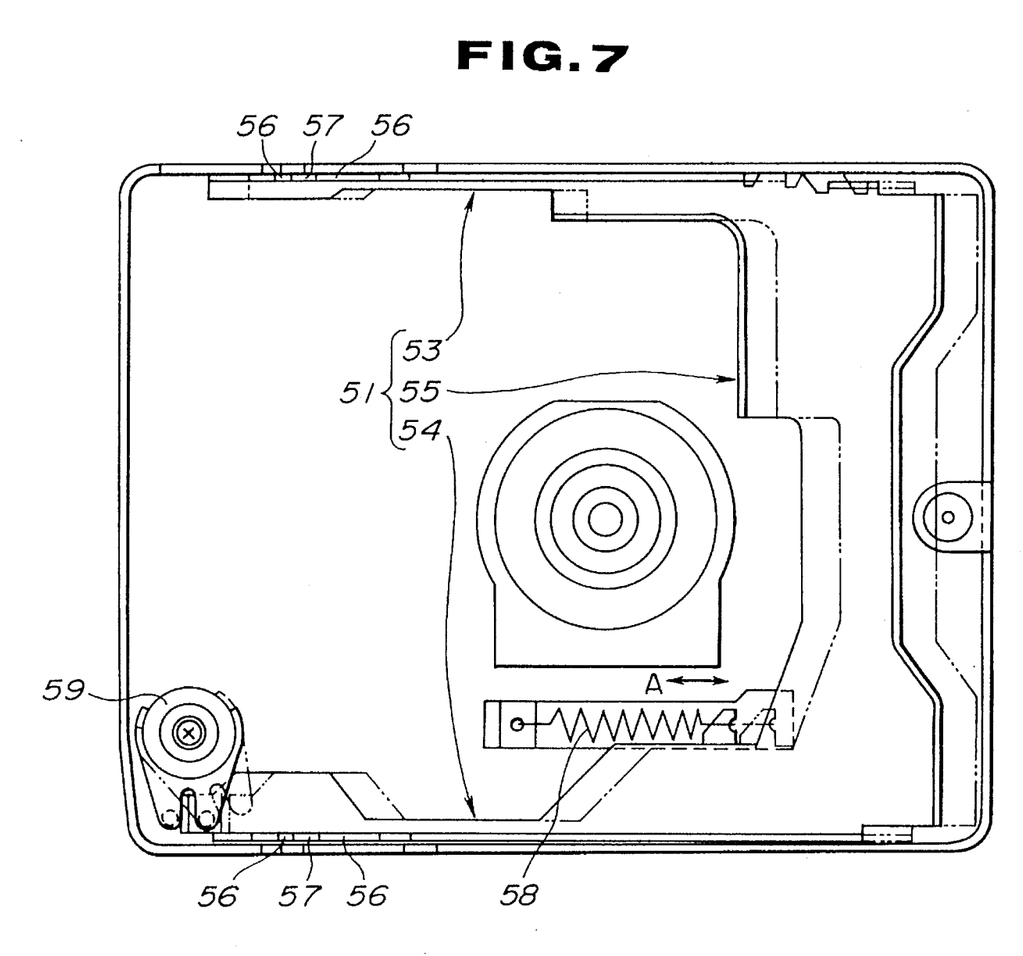
FIG. 7 is a view similar to FIG. 3, showing-the slider mounted on a chassis.

Referring to FIGS. 6 and 7, the slider 51 is formed into a U-shape in terms of a plane by a pair of side plates 53, 54 and a connecting plate 55 for connecting the ends of the pair of side plates 53, 54. The slider 51 is slidably mounted on the chassis 2.

Erectly arranged to the pair of side plates 53, 54 at their head are a pair of cam protrusions 56, 56 which are formed with inclined cam grooves 57, 57.

Referring also to FIGS. 4 and 5, the pair of cam protrusions 56, 56 are fitted between the pair of bearing lugs 27, 27 arranged to the chassis 2 and both side faces of the holder cover portion 44, respectively. The support shafts 3, 3 arranged to the holder cover portion 44 on both its side faces are fitted in the inclined cam grooves 57, 57, respectively.

Additionally, the slider 51 is fully biased in the unloading direction, i.e., in the direction of an arrow A in FIG. 6, by a coil spring 58 for slider operation, thus maintaining, as shown in FIG. 4, the support shafts 3, 3 biased to upper ends of the longitudinal bearing holes 28, 28 of the bearing lugs 27, 27 through the inclined cam grooves 57, 57.

As best seen in FIGS. 4 and 6, the pair of rotating levers 52, 52 have one pair of ends pivotally supported to the slider 51 through first shafts 61, 61, and another pair of ends pivotally supported to the side faces of the holder cover portion 44 through second shafts 62, 62.

When the slider 51 is biased in the unloading direction by force of the coil spring 58 for slider operation, the pair of rotating levers 52, 52 stand erect at a predetermined inclination angle θ to maintain the holder 4 in the unloading state. If the upper face of the holder cover portion 44 is pressed to put the holder 4 in the loading state, the rotating levers 52, 52 come down in the horizontal direction to reduce the inclination angle θ, sliding the slider 51 in the loading direction, i.e., in the direction of an arrow B in FIG. 4, by the first shafts 61, 61. As shown in FIG. 5, the support shafts 3, 3 are biased to lower ends of the longitudinal bearing holes 28, 28 of the bearing lugs 27, 27 through the inclined cam grooves 57, 57 of the cam protrusions 56, 56.

Referring to FIG. 7, a damper 59 is connected to the one 54 of the pair of side plates 53, 54 of the slider 51 at its head for adjusting a slide speed thereof.

Next, the holder lock plate 48 will be described.

Figure 8:
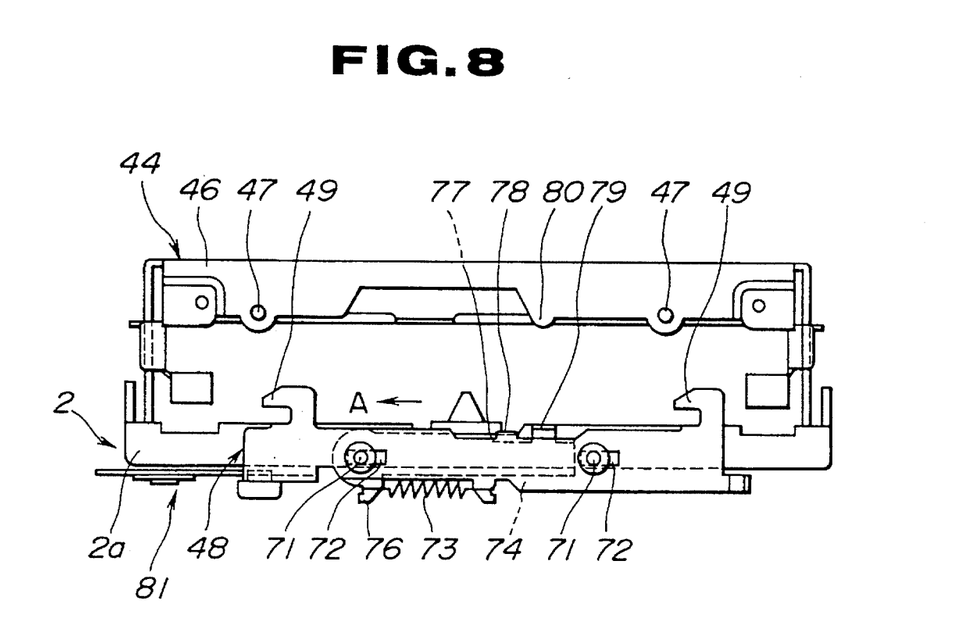
FIG. 8 is a front view showing the holder not locked by a holder lock plate.
Figure 9:
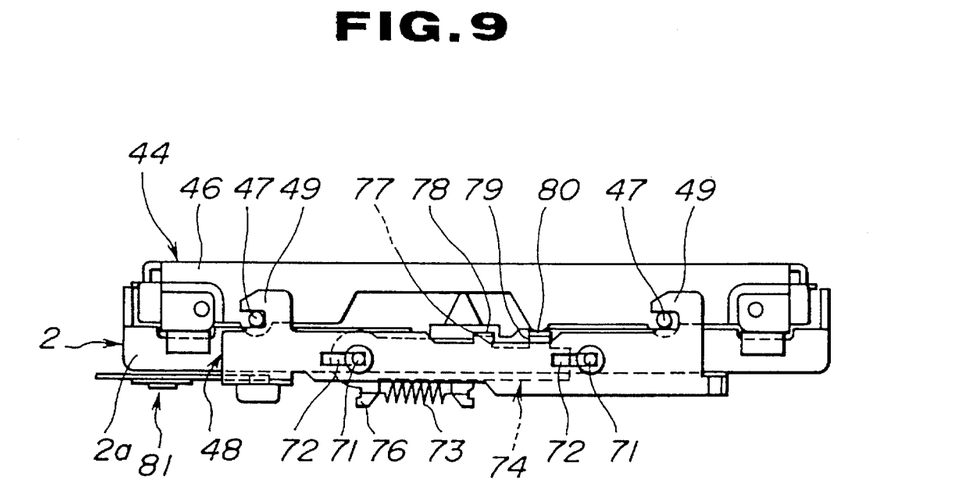
FIG. 9 is a view similar to FIG. 8, showing the holder locked by the holder lock plate.

As best seen in FIGS. 8 and 9, the holder lock plate 48 is slidably mounted to a front face 2a of the chassis 2 by guide pins 71, 71 and long holes 72, 72. A coil spring 73 for plate operation provides slide force to the pin engagement portions 49, 49 of the holder lock plate 48 in the direction to engage with the lock pins 47, 47 arranged to the end face plate 46 of the holder cover portion 44, i.e., in the direction of an arrow A in FIG. 8. A plate lock lever 74 operates to lock the holder lock plate 48 when being urged to slide in the position that its engagement with the lock pins 47, 47 is released through a lock release mechanism 81 which will be described later.

The plate lock lever 74 has one end rotatably mounted to the front face of the chassis 2 by the one guide pin 71 or left guide pin in FIG. 8 to be held between the front face of the chassis 2 and the holder lock plate 48. The plate lock lever 74 receives counterclockwise torque as viewed in FIG. 8 from the coil spring 73 for plate operation which has one end engaged with a spring engagement portion 76 arranged in the vicinity of the one end of the plate lock lever 74.

As best seen in FIG. 8, when the lock release mechanism 81 which will be described later urges the holder lock plate 48 up to the position that its engagement with the lock pins 47, 47 is released, an engaging portion 77 arranged to the plate lock lever 74 at its upper end is engaged with an engaged portion 78 arranged to the holder lock plate 48. This engagement restricts movement of the holder lock plate 48 in the direction to engage the pin engagement portions 49, 49 with the lock pins 47, 47, i.e., in the direction of an arrow A in FIG. 8, so that the holder lock plate 48 is locked in that position.

Additionally, the plate lock lever 74 has another end formed with a pressed portion 79 for lock release which is pressed. The holder 4 is placed in the loading position by a pressing portion 80 arranged to the holder cover portion 44 and by rotating clockwise the plate lock lever 74 as viewed in FIG. 8 to release engagement of the engaging portion 77 with the engaged portion 78. Thus, the holder lock plate 48 is urged to automatically slide leftward as viewed in FIG. 8 by force of the coil spring 73 for plate operation, so that the pin engagement portions 49, 49 are engaged with the lock pins 47, 47 arranged to the end face plate 46 of the holder cover portion 44 to hold the holder 4 in the loading position.

Next, the lock release mechanism 81 will be described.

Figure 10:
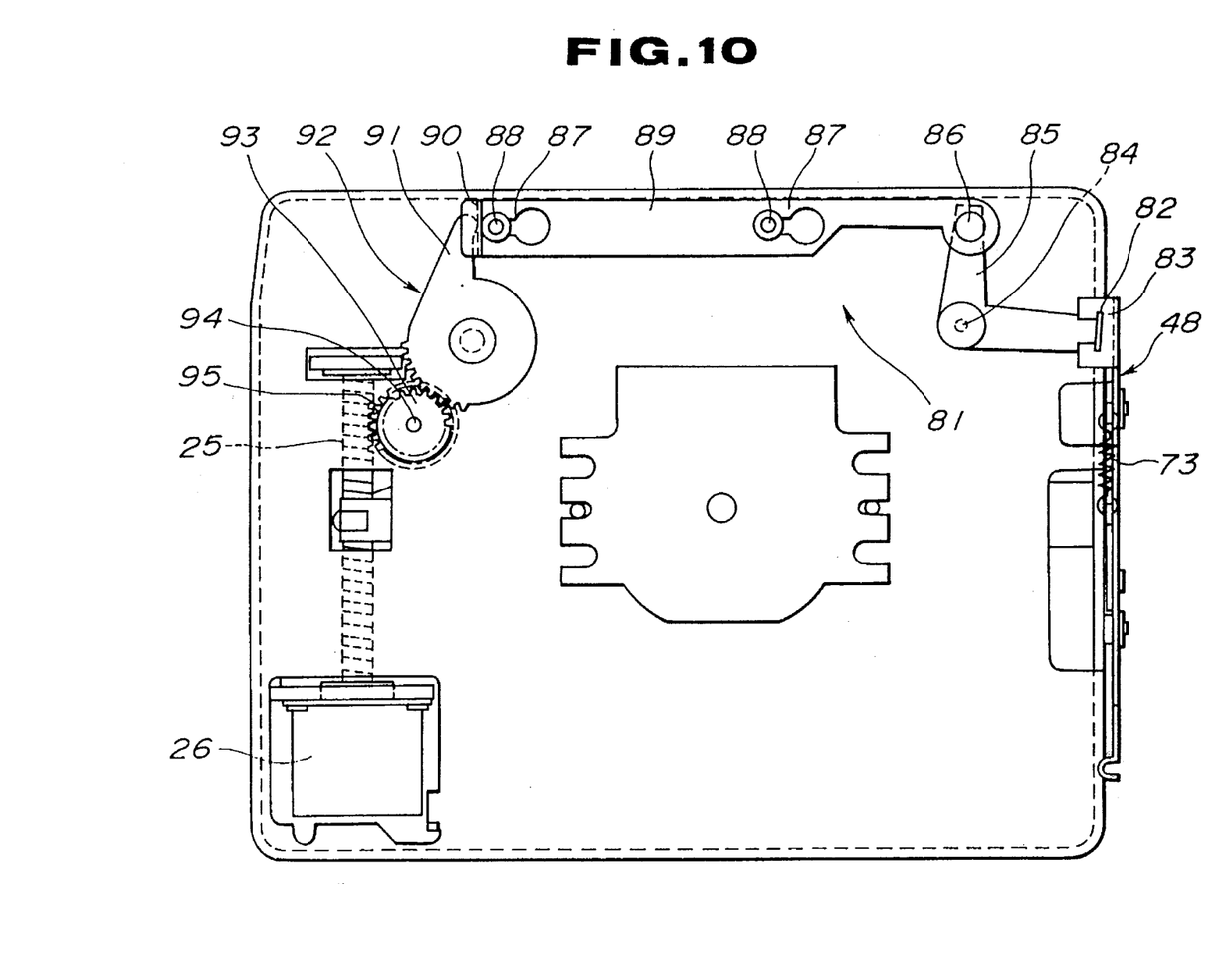
FIG. 10 is a bottom view showing the mechanism.

As best seen in FIGS. 3 and 10, the lock release mechanism 81 comprises a hook-shaped rotating lever 85 having one end formed with an engaging portion 82 which is engaged with an engaged portion 83 arranged to the holder lock plate 48 and a center portion pivotally supported on a lower face of the chassis 2 by a shaft 84. A slide lever 89 has one end pivotally supported to another end of the rotating lever 85 by a shaft 86 and is slidably mounted on the lower face of the chassis 2 by fitting in guide holes 87, 87 guide pins 88, 88 arranged on the lower face of the chassis 2. A cam gear 92 is formed with a cam protrusion 91 for pressing a pressed portion 90 arranged to another end of the slide lever 89. A pinion 93 is engaged with the cam gear 92 and a helical gear 95 is mounted to a rotation shaft 94 of the pinion 93 and is engaged with the lead screw 25 on the chassis 2.

When rotating the lead screw 25 in one direction, the cam gear 92 is rotated counterclockwise, i.e., from a state of a two-dotted chain line to a state of a broken line in FIG. 3, through the helical gear 95 and the pinion 93, so that the cam protrusion 91 presses the pressed portion 90. This action slides the slide lever 89 to the rotating lever 85 so as to rotate the rotating lever 85 on the shaft 84 counterclockwise, i.e., in the direction of an arrow C in FIG. 3.

With counterclockwise rotation of the rotating lever 85, the engaging portion 82 arranged at the one end of the rotating lever 85 presses the engaged portion 83 so as to slide the holder lock plate 48 in the lock release direction.

Figure 11:
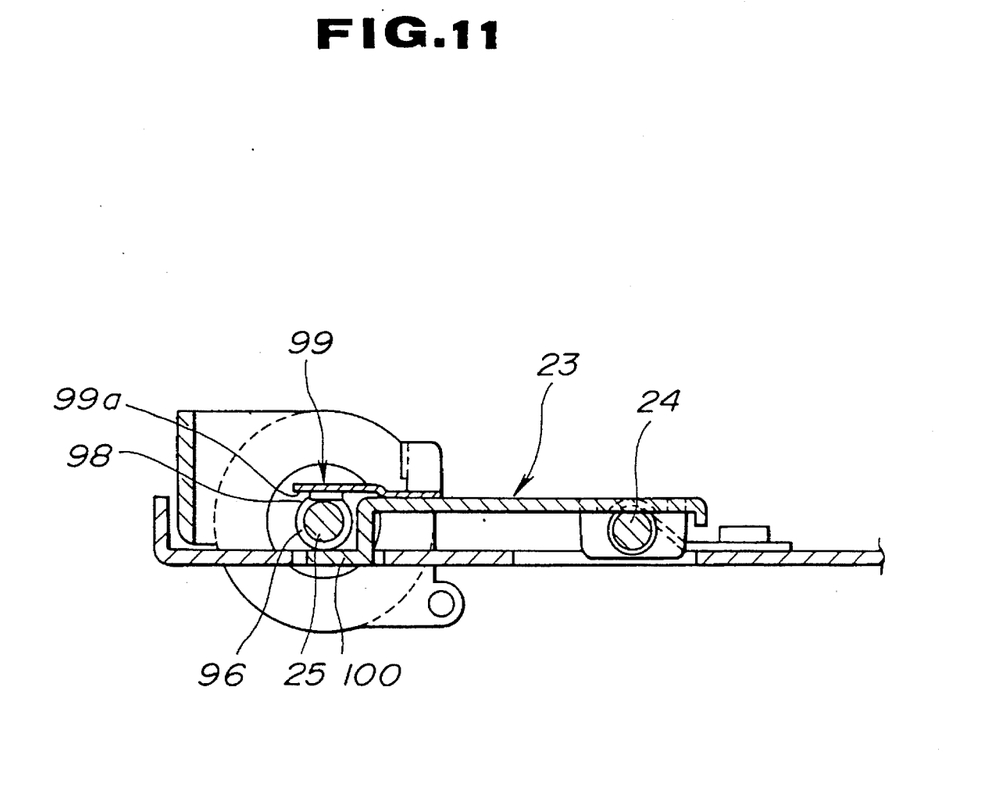
FIG. 11 is a view similar to FIG. 9, showing a head carriage.

Referring to FIG. 11, the head carriage 23 is provided with a feed spring or needle 98 engaged with a screw groove 96 of the lead screw 25 for changing rotational motion of the lead screw 25 into linear motion of the head carriage 23. A plate spring 99 having a flat contact surface 99a contacts a peripheral surface of the lead screw 25 for giving a load of the head carriage 23 on the lead screw 25.

Figure 12:
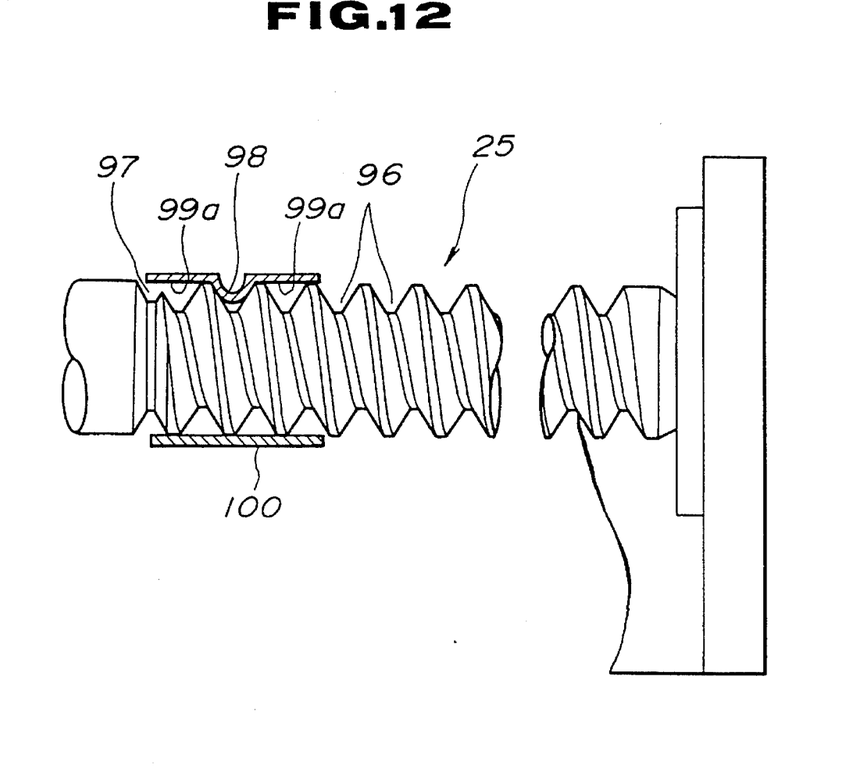
FIG. 12 is a view similar to FIG. 11, showing a lead screw.

Referring also to FIG. 12, the needle 98 is formed out of the plate spring 99 which undergoes press working, etc. so that a part of the plate spring 99 protrudes from a lower face thereof, and it is engaged with the screw groove 96 of the lead screw 25.

Substantially all of the lower face of the plate spring 99 from which the needle 98 protrudes forms the contact surface 99a which contacts, as shown in FIG. 12, a top of the screw groove 96 of the lead screw 25 over some pitches.

Additionally, a lead screw support 100 is arranged to the head carriage 23 below the plate spring 99 and in parallel therewith, the lead screw 25 being held between the lead screw support 100 and the lead screw contact surface 99a.

Since the head carriage 23 has the above construction, when the lead screw 25 is rotated by the stepping motor 26, the head carriage 23 travels along the guide shaft 24 through the needle 98 engaged with the screw groove 96.

At that time, since a load of the head carriage 23 is dispersely given to the peripheral surface of the lead screw 25 by the lead screw contact surface 99a of the lower face of the plate spring 99, a load to be given to the needle 98 is reduced, resulting in restraint of wear of the needle 98 and the screw groove 96 which are in contact therewith.

It is to be noted that in the above embodiment, the needle 98 and the lead screw contact surface 99a are integrally formed with the plate spring 99. Alternatively, the lead screw contact surface 99a may be formed with a member other than the needle 98.

As best seen in FIG. 12, a ring groove 97 is formed adjacent to one end of the screw groove 96 of the lead screw 25. Even when the feed spring or needle 98 of the head carriage 23 engaged with the lead screw 25 deviates from the range of the screw groove 96 upon operation of the lock release mechanism 81, the feed spring 98 is smoothly rotated along the ring groove 97. The ring groove 97 provents the occurrence of noises and vibrations by the feed spring 98 deviating from the range of the screw groove 96.

Referring again to FIG. 2, a cartridge ejecting lever 101 is rotatably mounted to the main body portion 43 of the holder 4 by a shaft 102. When inserting the disk cartridge 42 into the holder main body portion 43, the cartridge ejecting lever 101 is pressed by a front face of the disk cartridge 42 to rotate against force of a lever return spring 103. The lever return spring 103 provides torque to the disk cartridge 42 in the ejecting direction, so that upon ejection, the lever 101 is rotated backward by force of the lever return spring 103 to eject the disk cartridge 42 from the holder main body portion 43.

Figure 13:
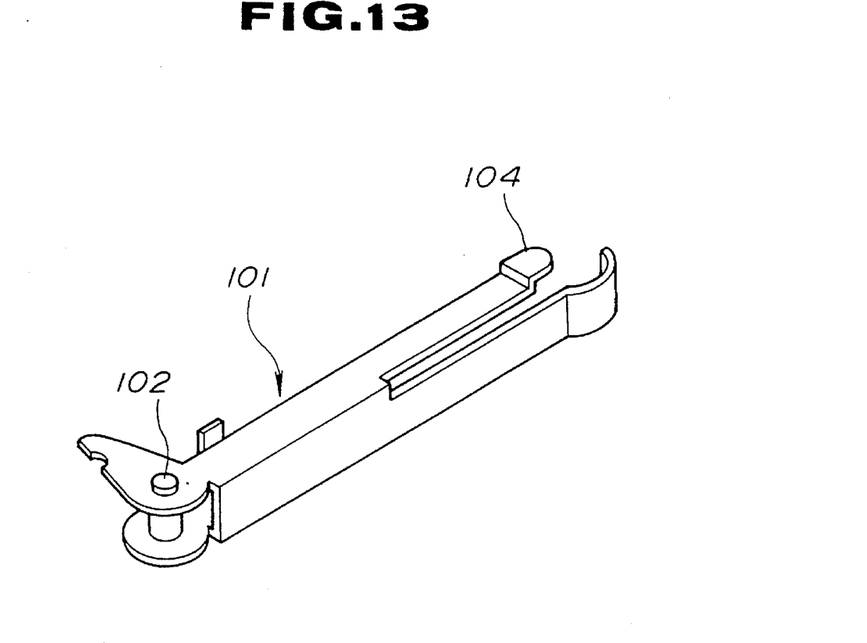
FIG. 13 is a view similar to FIG. 6, showing a cartridge ejecting lever.
Figure 14:
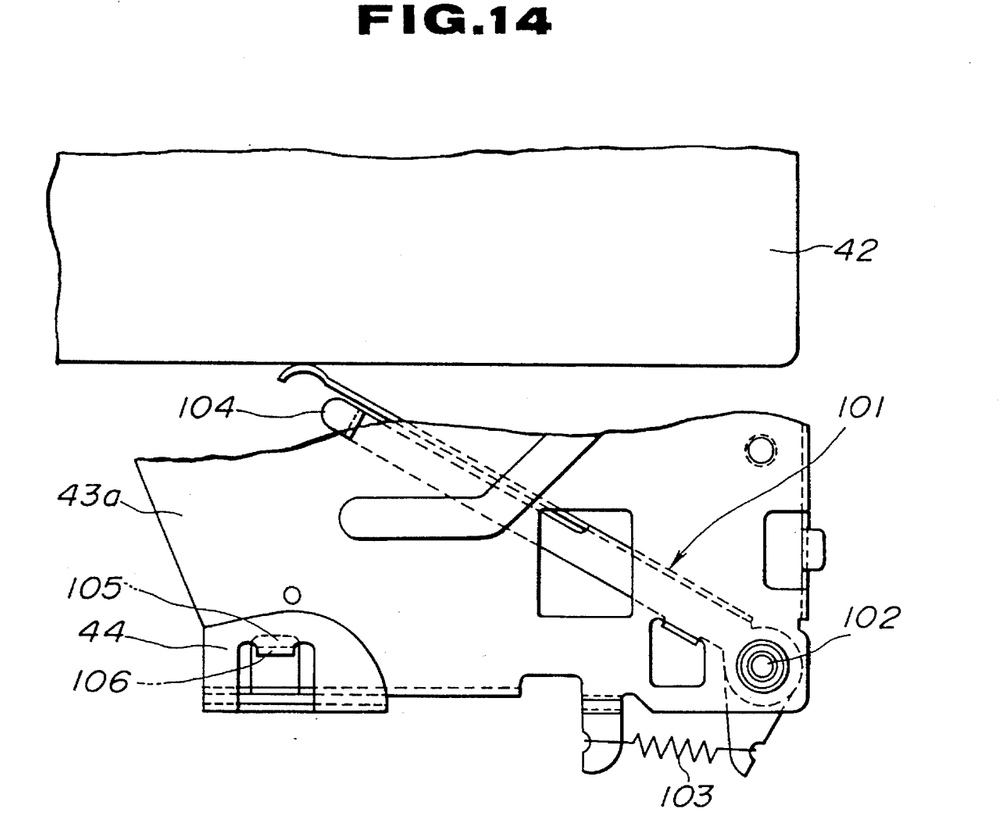
FIG. 14 is a view similar to FIG. 7, showing the cartridge ejecting lever before being pressed by a disk cartridge.
Figure 15:
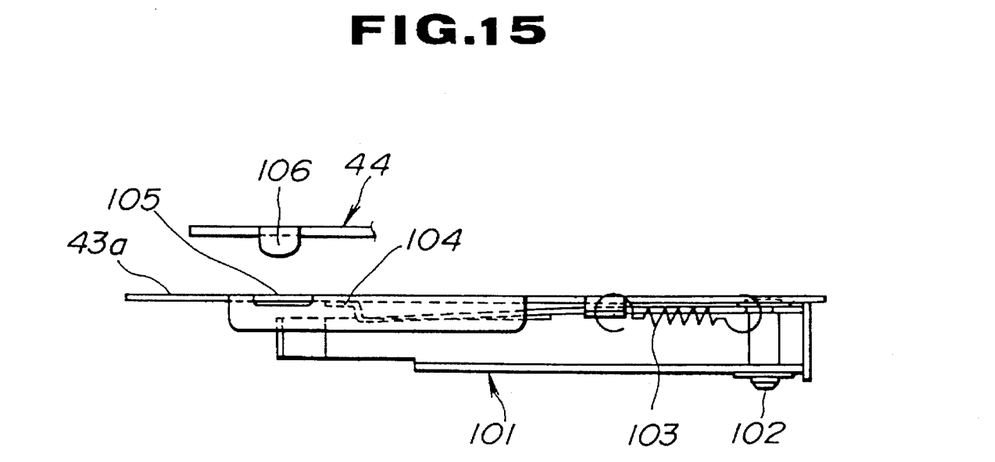
FIG. 15 is a view similar to FIG. 12, showing the cartridge ejecting lever before being pressed by the disk cartridge.

Referring also to FIG. 13, the cartridge ejecting lever 101 is formed out of a plate spring member, and has an upper end integrated with an elastic stopper lug 104 which is, as shown in FIGS. 14 and 15, in pressed contact with a lower face of a roof 43a of the holder main body portion 43.

Figure 16:
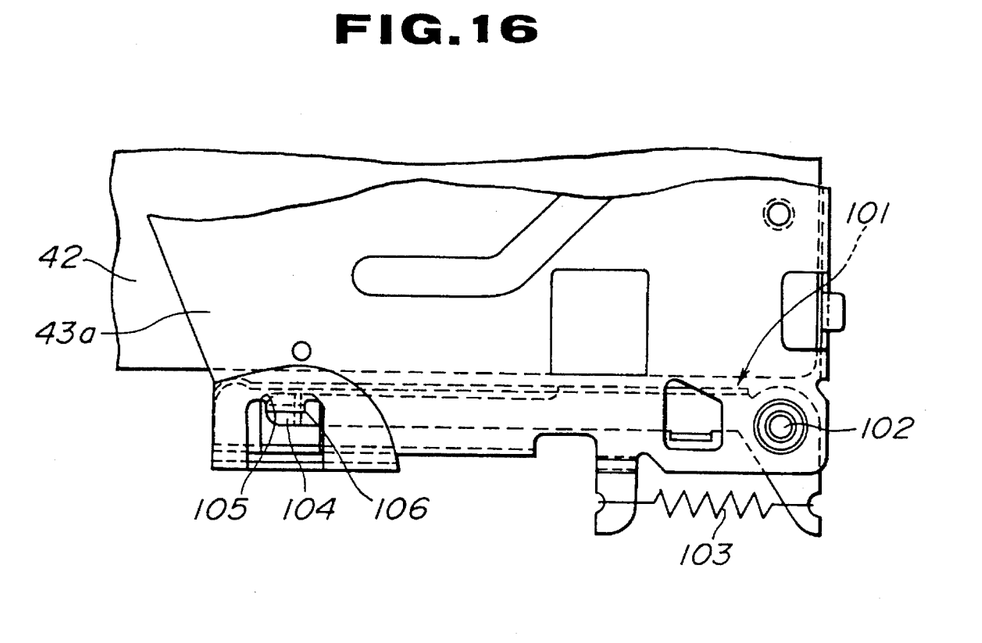
FIG. 16 is a view similar to FIG. 14, showing the cartridge ejecting lever locked.
Figure 17:
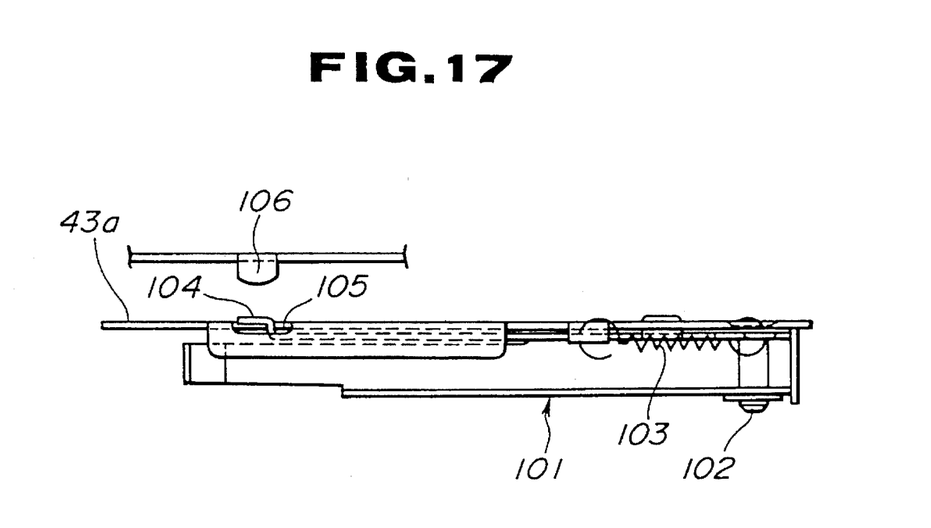
FIG. 17 is a view similar to FIG. 15, showing the cartridge ejecting lever locked.
Figure 18:
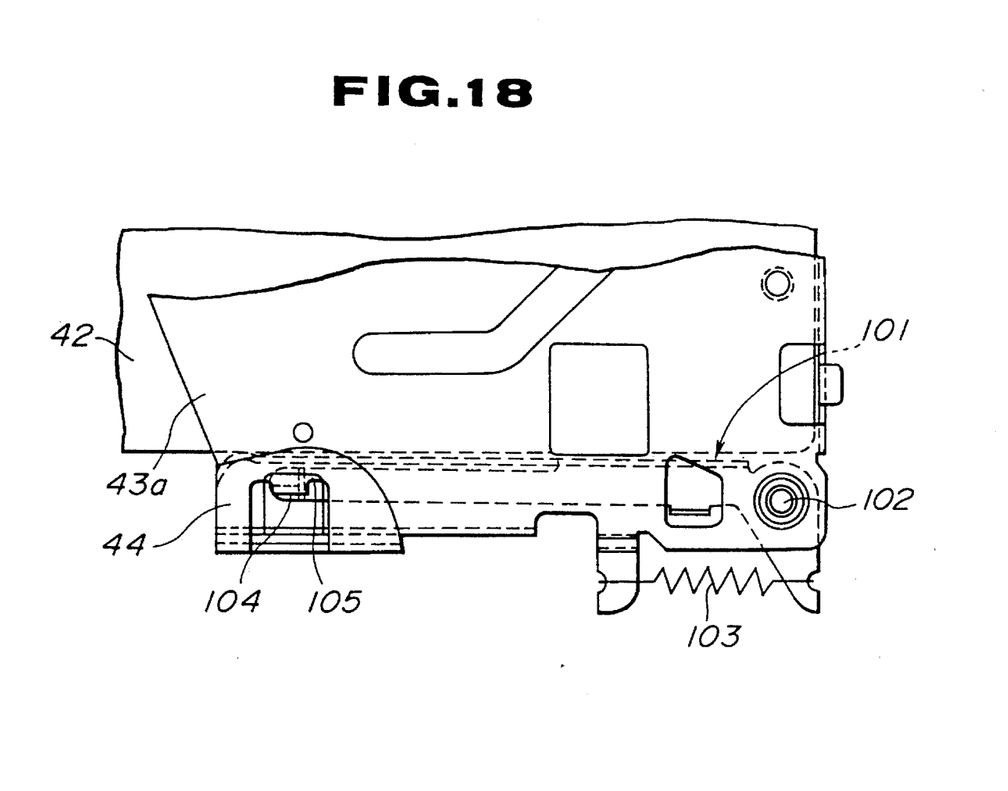
FIG. 18 is a view similar to FIG. 16, showing the cartridge ejecting lever released by being pressed by a cover portion.
Figure 19:
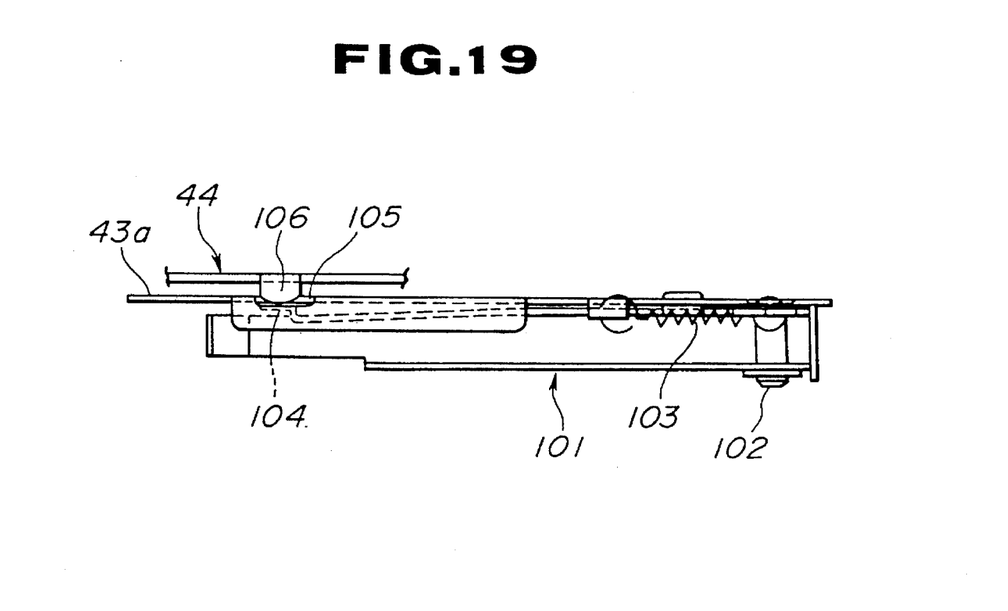
FIG. 19 is a view similar to FIG. 17, showing the cartridge ejecting lever released by being pressed by the cover portion.

When the cartridge ejecting lever 101 is rotated up to a predetermined position by being pressed by the disk cartridge 42, the elastic stopper lug 104 is elastically returned to engage with an engagement portion 105 arranged on the roof 43a of the holder main body portion 43 as shown in FIGS. 16 and 17, preventing backward rotation of the cartridge ejecting lever 101. When closing the holder cover portion 44, the elastic stopper lug 104 is pressed by a stopper pressing portion 106 formed on the holder cover portion 44 to release engagement with the engagement portion 105 as shown in FIGS. 18 and 19.

Next, the operation of the cartridge loading mechanism 5 will be described.

When inserting the disk cartridge 42 into the holder main body portion 43 in a state shown in FIG. 4 the cartridge ejecting lever 101 is rotated by being pressed by the disk cartridge 42. If the disk cartridge 42 comes at a predetermined position, the elastic stopper lug 104 is engaged with the engagement portion 105 of the holder main body portion 43 to lock the cartridge ejecting lever 101.

Thereafter, if the upper face of the holder cover portion 44 is pressed, the rotating levers 52, 52 of the holder drive mechanism 5 are rotated in a manner to come down so as to slide the slider 51 in the loading direction. Thus, the support shafts 3, 3 of the holder cover portion 44 are biased to the lower ends of the bearing holes 28, 28 of the bearing lugs 27, 27 through the inclined cam grooves 57, 57 of the slider 51. The holder cover portion 44 is rotated on the support shafts 3, 3 so that the end face plate 46 closes the cartridge take-off opening 41 of the holder main body portion 43. Then, the stopper pressing portion 106 of the holder cover portion 44 presses the stopper protrusion 104 of the cartridge ejecting lever 101 to release lock thereof. The cartridge ejecting lever 101 presses the disk cartridge 42 on the side thereof by force of the lever return spring 103 to put the disk cartridge 42 in press contact with the end face plate 46 of the holder cover portion 44, thus fixing the disk cartridge 42 in the holder 4.

When pressing further the holder cover portion 44, it lies on the holder main body portion 43, which are rotated up to the loading position.

If the holder 4 comes at the loading position, the pressed portion 79 for lock release of the plate lock lever 74 is pressed by the pressing portion 80 arranged to the holder cover portion 44, so that the plate lock lever 74 is rotated to release lock of the holder lock plate 48. Thus, the holder lock plate 48 is urged to slide in the lock direction by force of the coil spring 73 for plate operation to engage the pin engagement portions 49, 49 with the lock pins 47, 47 arranged to the end face plate 46 of the holder cover portion 44. The holder 4 is thus held in the loading position to carry out record or regeneration of the disk.

When ejecting the disk cartridge 42 after completion of recording or regenerating operation, the lead screw 25 is rotated in one direction to operate the lock release mechanism 81.

That is, with rotation of the lead screw 25 in one direction, the cam gear 92 is rotated through the helical gear 95 and the pinion 93, so that the cam protrusion 91 arranged to the cam gear 92 presses the pressed portion 90 arranged to the slide lever 89 to slide the slide lever 89. Sliding of the slide lever 89 causes rotation of the rotating lever 85 to slide the holder lock plate 48 in the lock release direction, thus releasing lock of the holder cover portion 44 by the holder lock plate 48, and locking the holder lock plate 48 in the release position by the plate lock lever 74.

When releasing lock of the holder cover portion 44 by the holder lock plate 48, the slider 51 of the holder drive mechanism 5 is urged to slide in the unloading direction by force of the coil spring 58 for slider operation. The support shafts 3, 3 are thus biased to the upper ends of the bearing holes 28, 28 of the bearing lugs 27, 27 through the inclined cam grooves 57, 57, and the holder 4 is rotated the unloading direction by the rotating levers 52, 52.

With rotation of the holder 4 in the unloading direction, the holder cover portion 44 is opened relative to the holder main body portion 43 by force of the torsion coil spring 45 interposed between the holder main body portion 43 and the holder cover portion 44 so as to remove blockage of the cartridge take-off opening 41 of the holder main body portion 43 by the end face plate 46. Thus, the disk cartridge 42 received in the holder main body portion 43 is automatically ejected from the cartridge take-off opening 41 by the cartridge ejecting lever 101. Then, in a manner as described above, the lead screw 25 is rotated in one direction to operate the lock release mechanism 81. After completion of lock release of the holder 4 by the holder lock plate 48, the lead screw 25 is reversed to remove pressing of the slide lever 89 by the cam gear 92 and return the head carriage 23 to the reference position for subsequent loading action.

It is to be noted that various variations and modifications may be made in the present invention. By way of example, the support shafts 3, 3 are arranged to the holder cover portion 44 in the embodiment as shown in connection with the drawings. Alternatively, the support shafts 3, 3 may be arranged to the holder main body portion 43.

Further, the bearing holes 28, 28 for guiding vertical movement of the support shafts 3, 3 may be replaced with guide pins arranged erectly to the chassis 2.

The cartridge loading mechanism of the present invention having the above construction produces the following effect:

1) Since the support shafts of the holder are vertically movably mounted to the chassis, and urged to move upward upon unloading of the holder, the open angle of the holder is reduced upon unloading thereof, therefore, the spindle motor, head, etc. are hard to see from below the holder, resulting in needlessness of the screen, etc.

2) The holder drive mechanism for moving downward the support shafts when the holder is rotated in the loading position and moving upward the support shafts when the holder is rotated in the unloading position is constructed by the slider to be urged to slide along the chassis for moving vertically the holder. The rotating levers have one end pivotally supported to the slider and another end pivotally supported to the chassis for rotating the holder in the unloading direction when the slider is biased in the direction to move upward the holder, and in the loading direction when the slider is biased in the direction to move downward the holder. The support shafts can vertically be moved in linkage with rotation of the holder. Further, due to a reduction in the open angle of the holder, the thickness of the main body of the cartridge loading mechanism can be decreased.

3) Since the lead screw fulfills lock release, the motor for use in the lock release mechanism is not needed, allowing a reduction in number of parts, resulting in a decrease in size and weight as well as a lower cost.

4) The cartridge ejecting lever is integrally formed with the elastic stopper lug for preventing return motion of the cartridge ejecting lever. The elastic stopper lug returning elastically to engage with the engagement portion is arranged to the holder when the cartridge ejecting lever is pressed by the disk to rotate up to a predetermined position. A arm lock mechanism independent of the cartridge ejecting lever is not needed, enabling a reduction in number of parts and cost. Further, a space for assembling the arm lock mechanism is not needed, resulting in an advantage in terms of a reduction in size, thickness, and weight of the disk drive mechanism.

What is claimed is:

1. A cartridge loading mechanism for use in a disk recording and/or regenerating device for recording and/or regenerating signals on a disk received in a cartridge, comprising:

a chassis;

a holder arranged to hold the cartridge, said holder having a cartridge take-off opening at a first end and a fulcrum at a second end opposite said first end for rotatably supporting said holder to said chassis for carrying out a loading and an unloading of the cartridge, said fulcrum comprising a support shaft; and drive means for moving said fulcrum of said holder away from said chassis with a rotation of said holder in a direction of said unloading of the cartridge and moving said fulcrum of said holder toward said chassis with a rotation of said holder in a direction of said loading of the cartridge;

wherein said second end of said holder rotatably supported to said chassis moves vertically toward said chassis during a loading of the cartridge and moves vertically away from said chassis during an unloading of the cartridge; and wherein said drive means comprises:

a slider which is urged to slide along said chassis toward said first end of said holder for moving said support shaft vertically toward said chassis and is urged to slide toward said second end of said holder for moving said support shaft vertically away from said chassis; and a rotating lever having one end pivotally supported to said slider and another end pivotally supported to said holder, said rotating lever rotating said holder in said direction of said unloading of the cartridge when said slider moves said support shaft away from said chassis, and in said direction of said loading of the cartridge when said slider moves said support shaft toward said chassis.

2. A cartridge loading mechanism as claimed in claim 1, wherein said slider comprises an inclined cam groove for engaging said support shaft.

3. A cartridge loading mechanism as claimed in claim 2, wherein said slider comprises a resilient member for biasing said slider in said direction of said unloading of the cartridge with respect to said chassis.

4. A cartridge loading mechanism for use in a disk recording and/or regenerating device for recording and/or regenerating signals on a disk received in a cartridge, comprising:

a chassis;

a holder arranged to hold the cartridge, said holder having a cartridge take-off opening at a first end and a fulcrum at a second end opposite said first end for rotatably supporting said holder to said chassis for carrying out a loading and an unloading of the cartridge; and drive means for moving said fulcrum of said holder away from said chassis With a rotation of said holder in a direction of said unloading of the cartridge and moving said fulcrum of said holder toward said chassis with a rotation of said holder in a direction of said loading of the cartridge, said drive means comprising a drive linkage interconnected between said holder and said fulcrum for mechanically moving said fulcrum when said holder is rotated;

wherein said second end of said holder rotatably supported to said chassis moves vertically toward said chassis during a loading of the cartridge and moves vertically away from said chassis during an unloading of the cartridge;

wherein said fulcrum of said holder comprises a support shaft fixed to said chassis;

wherein said drive linkage comprises a slider which is urged to slide along said chassis in a first direction for moving said fulcrum vertically toward said chassis and is urged to slide along said chassis in a second direction for moving said fulcrum vertically away from said chassis; and wherein said slider is arranged to slide toward said first end of said holder for moving said support shaft vertically toward said chassis and toward said second end of said holder for moving said support shaft vertically away from said chassis.

5. A cartridge loading mechanism for use in a disk recording and/or regenerating device for recording and/or regenerating signals on a disk received in a cartridge, comprising:

a head carriage provided with a head for recording and/or regenerating the signals on the disk;

a chassis arranged to slidably support said head carriage for motion in a radial direction of the disk, said chassis comprising a drive means for driving said head carriage;

a holder for holding the cartridge, said holder having a cartridge take-off opening at a first end and a fulcrum at a second end opposite said first end for rotatably supporting said holder to said chassis for carrying out a loading and an unloading of the cartridge, said fulcrum comprising a support shaft;

said drive means including means for moving said fulcrum of said holder away from said chassis with a rotation of said holder in a direction of said unloading of the cartridge, and moving said fulcrum of said holder toward said chassis with a rotation of said holder in a direction of said loading of the cartridge;

lock means locking said holder in a position of said loading of the cartridge; and lock release means, engaged with said lock means, for driving said lock means to release said lock means of said holder with an actuation of said drive means;

said drive means comprising a slider which is urged to slide along said chassis toward said first end of said holder for moving said support shaft vertically toward said chassis and is urged to slide along said chassis toward said second end of said holder for moving said support shaft vertically away from said chassis, and a rotating lever having one end pivotally supported to said slider and another end pivotally supported to said holder, said rotating lever rotating said holder in said direction of said unloading of the cartridge when said slider moves said support shaft away from said chassis, and in said direction of said loading of the cartridge when said slider moves said support shaft toward said chassis.

* * * * *